US012782293B2

(12) United States Patent
Lee et al.

(10) Patent No.: US 12,782,293 B2
(45) Date of Patent: Nov. 3, 2026

(54) ELECTRODE SHEET DEFECT INSPECTION DEVICE

(71) Applicant: LG Energy Solution, Ltd., Seoul (KR)

(72) Inventors: Jong Hwa Lee, Daejeon (KR); Ee Beom Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 202 days.

(21) Appl. No.: 18/851,179

(22) PCT Filed: Dec. 12, 2023

(86) PCT No.: PCT/KR2023/020385
§ 371 (c)(1),
(2) Date: Sep. 26, 2024

(87) PCT Pub. No.: WO2024/128744
PCT Pub. Date: Jun. 20, 2024

(65) Prior Publication Data

US 2025/0224341 A1 Jul. 10, 2025

(30) Foreign Application Priority Data

Dec. 14, 2022 (KR) ........................ 10-2022-0174614

(51) Int. Cl.
*G01N 21/89* (2006.01)
*G01N 21/88* (2006.01)
*H01M 4/04* (2006.01)

(52) U.S. Cl.
CPC ..... *G01N 21/8914* (2013.01); *G01N 21/8803* (2013.01); *G01N 21/8851* (2013.01);
(Continued)

(58) Field of Classification Search
CPC ........... G01N 21/8914; G01N 21/8803; G01N 21/8851; G01N 2021/888; G01N 2021/8918; H01M 4/04
See application file for complete search history.

(56) References Cited

U.S. PATENT DOCUMENTS

2003/0025090 A1 2/2003 Iwasaki
2021/0234145 A1 7/2021 Chung
2023/0349834 A1* 11/2023 Choi .................. G01N 21/8803

FOREIGN PATENT DOCUMENTS

JP 2003040488 A 2/2003
JP 2009271037 A 11/2009
(Continued)

OTHER PUBLICATIONS

International Search Report for PCT/KR2023/020385 mailed Mar. 20, 2024. 3 pages.
(Continued)

*Primary Examiner* — Georgia Y Epps
*Assistant Examiner* — Don J Williams
(74) *Attorney, Agent, or Firm* — Lerner David LLP

(57) ABSTRACT

An electrode sheet defect inspection device includes a vision inspection part configured to inspect defects in each tab part during a traveling process of an electrode sheet on which a plurality of tab parts is formed; a marking part configured to print a defective mark on a selected tab part in response to the tab part being determined to be defective, based on inspection information of the vision inspection part; a tab guide part configured to pass the tab parts when the electrode sheet passes through the marking part and a mark inspection part configured to inspect the defective mark printed on the tab part exposed to an outside through the opening of the tab guide part. The tab guide part has an opening for exposing a partial region of the tab parts traveling to the outside, and the tab guide part includes a transparent region adjacent to the opening.

15 Claims, 5 Drawing Sheets

(52) U.S. Cl.
CPC ........ *H01M 4/04* (2013.01); *G01N 2021/888* (2013.01); *G01N 2021/8918* (2013.01)

(56) References Cited

FOREIGN PATENT DOCUMENTS

| | | | |
|---|---|---|---|
| JP | 2015002149 | A | 1/2015 |
| JP | 2015167078 | A | 9/2015 |
| KR | 20060027261 | A | 3/2006 |
| KR | 20080019128 | A | 3/2008 |
| KR | 20120110418 | A | 10/2012 |
| KR | 20150061825 | A | 6/2015 |
| KR | 20200026144 | A | 3/2020 |
| KR | 102261757 | B1 | 6/2021 |
| KR | 102363977 | B1 | 2/2022 |
| KR | 20220051699 | A | 4/2022 |
| KR | 20220060732 | A | 5/2022 |
| KR | 20220093524 | A | 7/2022 |

OTHER PUBLICATIONS

Extended European Search Report including Written Opinion for Application No. 23903947.2 dated Jul. 18, 2025. 7 pgs.

* cited by examiner

[Figure 1]
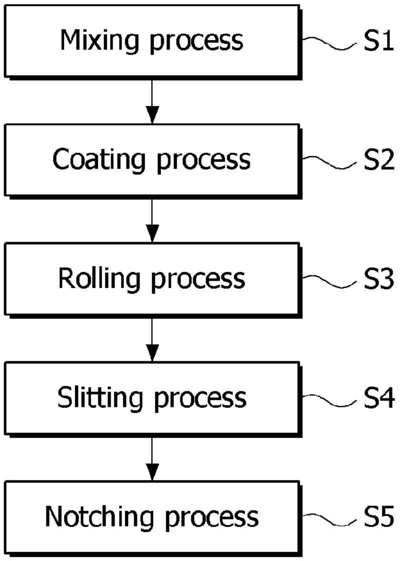
[Figure 2]
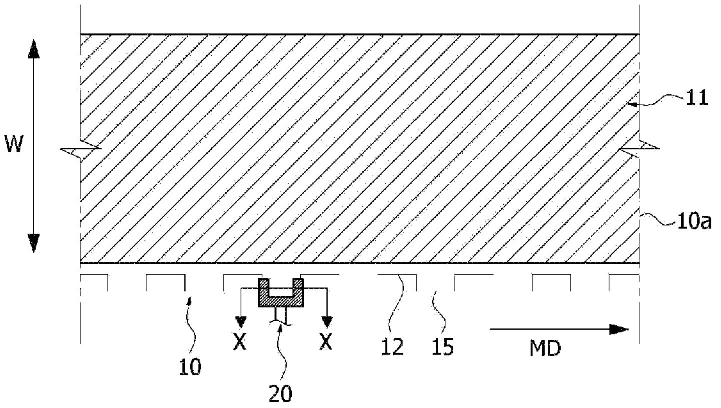

[Figure 3]
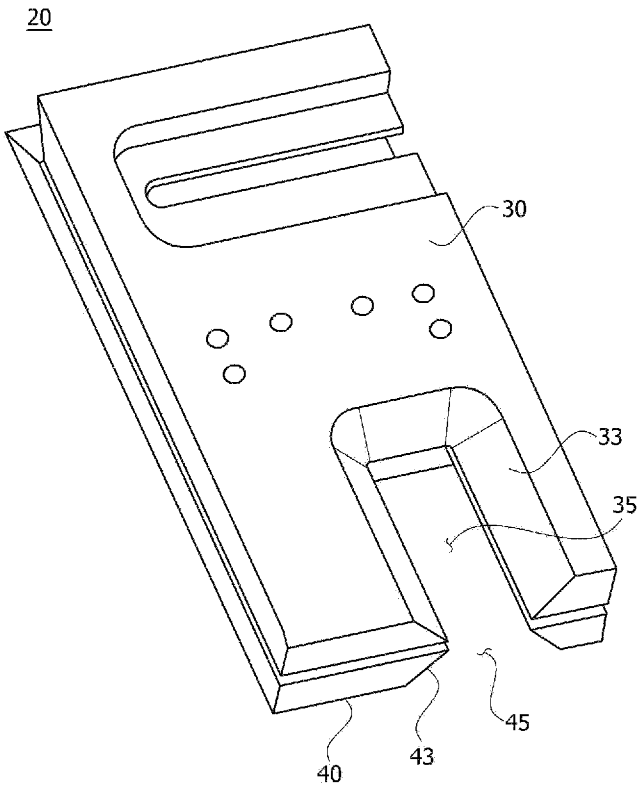
[Figure 4]
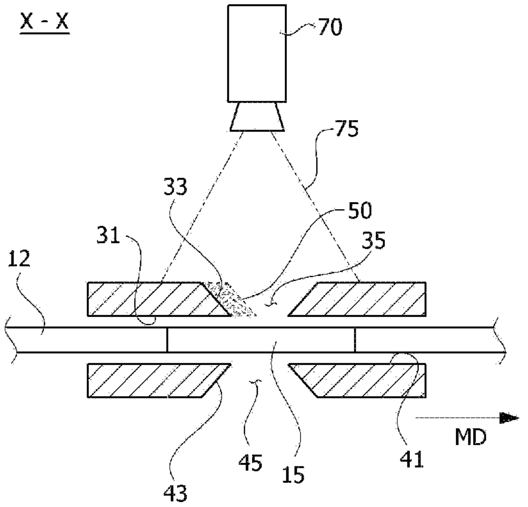

[Figure 5]
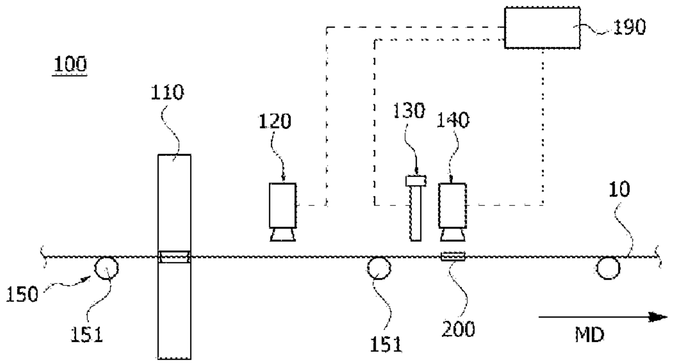
[Figure 6]
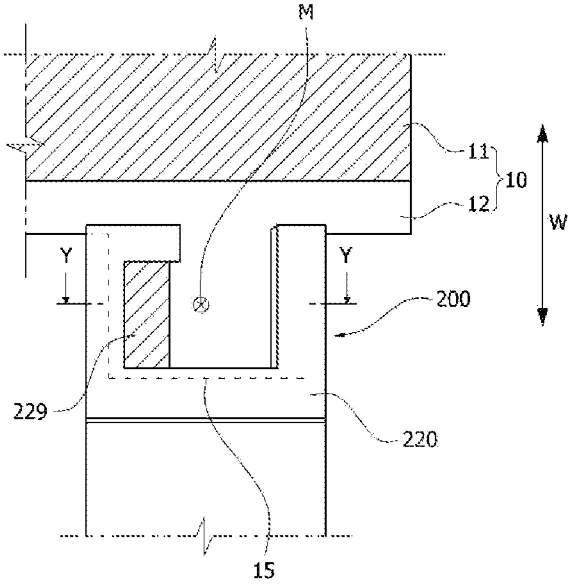

[Figure 7]
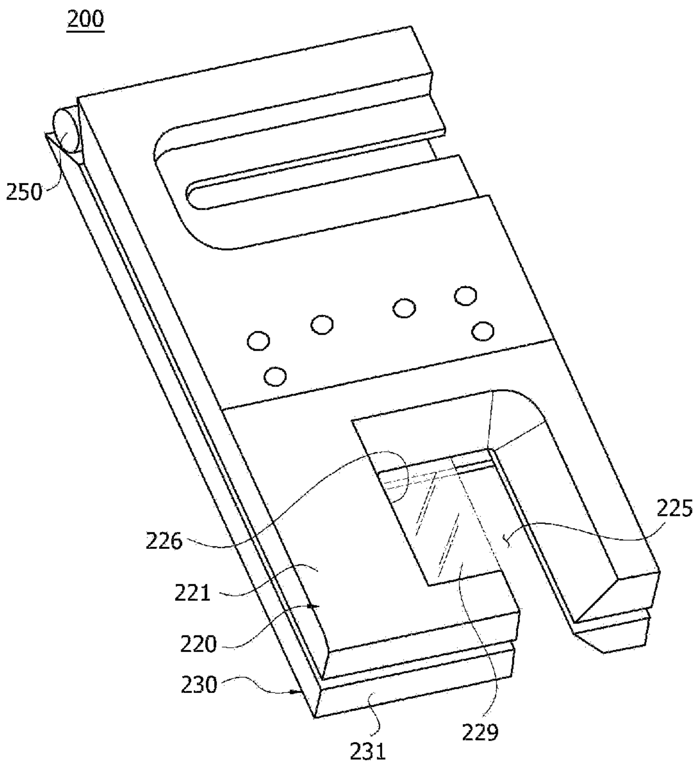
[Figure 8]
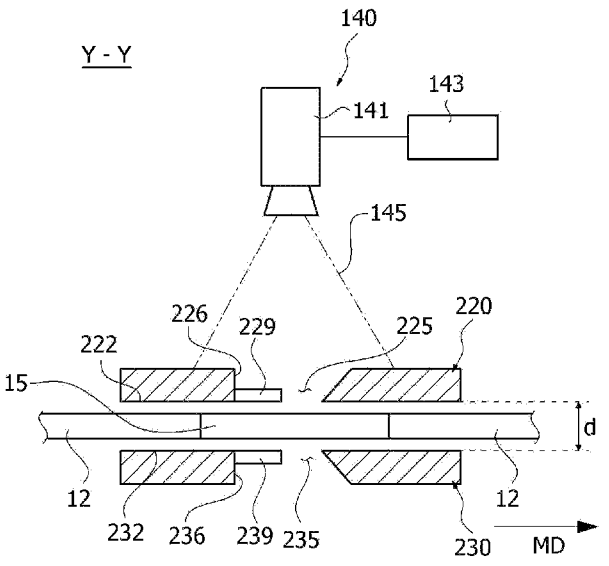

[Figure 9]
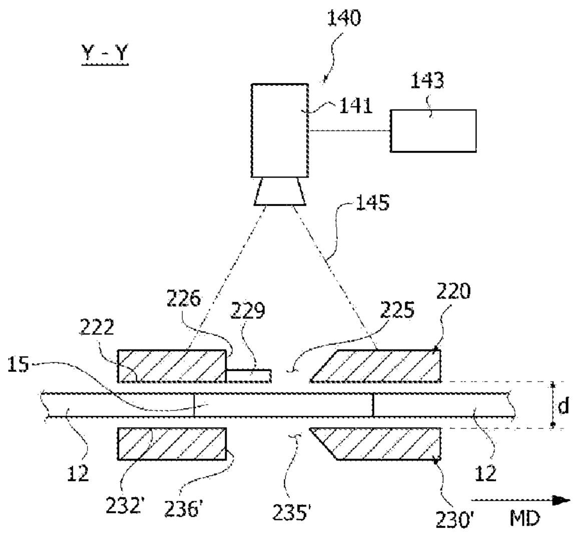

ELECTRODE SHEET DEFECT INSPECTION DEVICE

CROSS-REFERENCE TO RELATED APPLICATIONS

The present application is a national phase entry under 35 U.S.C. § 371 of International Application No. PCT/KR2023/020385 filed Dec. 12, 2023, which claims priority from Korean Patent Application No. 10-2022-0174614 filed Dec. 14, 2022, all of which are incorporated herein by reference.

FIELD OF THE DISCLOSURE

The present disclosure relates to an electrode sheet defect inspection device and relates to an electrode sheet defect inspection device capable of preventing shadows from occurring upon inspecting defective marks by forming a partial region of a tab guide part with a transparent material.

BACKGROUND ART

The types of devices that use secondary batteries as an energy source increase. Particularly, lithium secondary batteries are also used in a small-sized battery cell field used in mobile devices or small electronic products, and a medium and large-sized battery pack field used as an energy source for electric vehicles or power storage systems, and the like that require high output and high voltage, due to advantages such as high energy density and high charging voltage.

The lithium secondary battery is manufactured by housing an electrode assembly and an electrolyte in a battery case, and sealing them. The electrode assembly is formed by laminating a positive electrode and a negative electrode with a separator interposed therebetween.

The secondary battery manufacturing process comprises an electrode process, an assembly process, and an activation process, where the electrode process is a process of making a positive electrode and a negative electrode.

FIG. 1 is an electrode process flowchart of a secondary battery.

As shown in FIG. 1, the electrode process may comprise a mixing process (S1), a coating process (S2), a rolling process (S3), a slitting process (S4), and a notching process (S5).

The mixing process (S1) is a process of measuring and mixing various raw materials necessary to make a negative electrode and a positive electrode, where a positive electrode slurry or a negative electrode slurry, in which various raw materials are mixed in the mixing process (S1), is produced.

The coating process (S2) is a process of coating the positive electrode or negative electrode slurry on an electrode sheet (10) (see FIG. 2, for example, copper or aluminum) through a coating device. The electrode sheet (10) coated with the positive electrode or negative electrode slurry through the coating process (S2) is transferred to the rolling process (S3).

The rolling process (S3) is a process of rolling the slurry coated on the electrode sheet (10) while passing the electrode sheet (10) between two rolling rolls (not shown). In the slurry on the electrode sheet (10), its density increases and its volume decreases by the rolling process (S3).

FIG. 2 is a schematic diagram showing an arrangement state of a tab guide (20) with respect to an electrode sheet (10), FIG. 3 is a perspective diagram schematically showing a tab guide (20) according to a conventional art, and FIG. 4 is a diagram in a state cut along the line X-X of FIG. 2, which shows an arrangement state of a mark inspection part (70) and a tab guide (20).

After the rolling process (S3), the electrode sheet (10) is transferred to a cutting process (S4, S5). The cutting process (S4, S5) comprises a slitting process (S4) and a notching process (S5).

Here, the slitting process (S4) is a process of cutting the electrode sheet (10) into a plurality of electrodes. Then, the notching process (S5) is a process for forming a tab part (15) using a laser or the like on a plain part (12) on which the slurry is not applied on an electrode base material (10*a*).

In this instance, in the notching process (S5), which is the last step of the electrode process, a defect inspection of the tab part (15) for the electrode sheet (10) after notching is performed. After the notching process (S5), the tab part (15) of the electrode sheet (10) is inspected for defects based on photographic information obtained by photographing the tab part (15) of the electrode sheet (10) using a vision camera. In this instance, lifting or sagging of the tab part (15), and the like is checked through the defect inspection of the tab part (15).

Afterwards, based on the vision inspection information, a defective mark is indicated on the tab part (15) that is determined to be defective. For example, the defective mark may be printed on the tab part (15) where a defect exists in the electrode sheet (10).

Afterwards, it is inspected whether the defective mark has been properly printed on the tab part (15) of the electrode sheet (10).

Upon inspecting defective marks, the tab guide (20) is used. Referring to FIGS. 2 and 3, the tab guide (20) is disposed to pass the edge of the electrode sheet (10) in the width direction (W), that is, the plain part (12) on which the tab part (15) is formed.

Referring to FIGS. 3 and 4, the conventional tab guide (20) comprises an upper guide member (30) and a lower guide member (40).

The upper guide member (30) and the lower guide member (40) are disposed above and below the tab part (15) of the electrode sheet (10), respectively, and provided to pass through the tab part (15) of the electrode sheet (10) under traveling through a gap between the upper guide member (30) and the lower guide member (40).

Referring to FIG. 4, the upper tab guide member (30) has an upper guide surface (31), an upper inclined surface (33), and an upper opening (35), and the upper inclined surface (33) is provided to be inclined upward from the upper guide surface (31). The upper opening (35) is an opening that penetrates the upper guide member (30) up and down, which exposes the defective mark printed on the tab part (15) to the mark inspection part (70.) The mark inspection part (70) is a vision camera, which may have a predetermined inspection region (75), and may be disposed at the upper portion of the electrode sheet (10).

In addition, the lower guide member (40) has a lower guide surface (41), a lower inclined surface (43), and a lower opening (45), and the lower guide surface (41) is disposed to face the upper guide surface (31).

Referring to FIG. 4, upon inspecting the defective mark of the tab part (15), when light is irradiated to the inspection region (75), a shadow (50) may occur in the portion corresponding to the upper opening (35) of the upper guide member (30). In this instance, the mark inspection part (70) recognizes the shadow (50) as the defective mark, whereby there is a problem in which the normal portion is treated as a defective portion. At this time, there occurs a problem in that the equipment needs to be stopped due to an inspection error in the mark inspection part (70).

BRIEF SUMMARY

Technical Problem

It is a problem to be solved by the present disclosure to provide an electrode sheet defect inspection device capable of preventing shadows from occurring in an inspection region when inspecting defective marks by forming a partial region of a tab guide part with a transparent material.

Technical Solution

An electrode sheet defect inspection device according to one example of the present disclosure comprise a vision inspection part provided to inspect defects in each tab part during a traveling process of an electrode sheet on which a plurality of tab parts is formed, a marking part printing a defective mark on the tab part determined to be defective, based on inspection information of the vision inspection part, a tab guide part disposed to pass the tab part of the electrode sheet passing through the marking part, having an opening for exposing a partial region of the tab part during traveling to the outside, and provided so that a partial region surrounding the opening is transparent, and a mark inspection part provided to inspect the defective mark indicated on the tab part exposed to the outside through the opening of the tab guide part.

Also, the tab guide part may comprise an upper guide member disposed at the upper portion of the tab part of the electrode sheet during traveling, and having a first main body having a first opening for exposing the tab part and an upper transparent member provided to cover a partial region of the first opening, and a lower guide member disposed at the lower portion of the tab part of the electrode sheet during traveling, and positioned to be apart at a predetermined interval from the upper guide member.

In addition, the tab guide part may be disposed so that the tab part of the electrode sheet during traveling passes through the interval between the upper guide member and the lower guide member. That is, the upper guide member and the lower guide member may be disposed to be spaced apart at a predetermined interval so that the electrode sheet can pass between the upper guide member and the lower guide member even when lifting or sagging, and the like occurs in the tab part of the electrode sheet.

Furthermore, the upper guide member may have a first guide surface where the first main body faces the upper surface of the tab part.

Also, the upper transparent member may be provided so that one surface is positioned on the same plane as the first guide surface.

In addition, the upper guide member may be provided such that the first guide surface comprises a non-transparent region through which light does not transmit.

Furthermore, the upper guide member may be provided so that a mounting surface, on which the upper transparent member is mounted, is orthogonal to the first guide surface.

Also, the electrode sheet defect inspection device, wherein in the upper guide member, the first main body and the upper transparent member are formed of different materials. In addition, the upper transparent member may be formed of a glass material.

Furthermore, the mark inspection part may be provided to inspect the defective mark indicated on the tab part exposed through the first opening of the upper guide member. That is, the mark inspection part may be disposed at the upper portion of the tab part of the electrode sheet during traveling.

Also, the lower guide member may have a second main body having a second opening for exposing the tab part, and a lower transparent member provided to cover a partial region of the second opening. As one example, the lower guide member may have the same structure as the upper guide member, and the upper guide member and the lower guide member may have a vertically symmetric shape based on the electrode sheet during traveling.

In addition, the lower guide member may have a second guide surface where the second main body faces the lower surface of the tab part.

Also, the lower transparent member may be provided so that one surface is positioned on the same plane as the second guide surface.

In addition, the lower guide member may be provided so that the second guide surface comprises a non-transparent region through which light does not transmit.

Furthermore, the lower guide member may be provided so that a mounting surface, on which the lower transparent member is mounted, is orthogonal to the second guide surface.

Also, in the lower guide member, the second main body and the lower transparent member may be formed of different materials.

In addition, the lower transparent member may be formed of a glass material.

Advantageous Effects

As discussed above, the electrode sheet defect inspection device related to one example of the present disclosure has the following effects.

As it is equipped with the transparent member made of the transparent material on the opening side of the tab guide part exposing the defective mark formed on the tab part of the electrode sheet to the outside, it is possible to prevent shadows from occurring upon defect inspection.

In addition, by preventing shadows from occurring in the inspection region of the mark inspection part for inspecting the defective mark formed on the tab part, it is possible to prevent inspection errors, and it is possible to improve inspection accuracy of the mark inspection part.

DESCRIPTION OF DRAWINGS

FIG. 1 is an electrode process flowchart of a secondary battery.

FIG. 2 is a schematic diagram showing an arrangement state of a tab guide with respect to an electrode sheet.

FIG. 3 is a perspective diagram schematically showing a tab guide according to a conventional art.

FIG. 4 is a diagram in a state cut along the line X-X of FIG. 2, which shows an arrangement state of a mark inspection part and a tab guide.

FIG. 5 is a schematic diagram showing an electrode sheet defect inspection device according to one example of the present disclosure.

FIG. 6 is a schematic diagram showing an arrangement state of a tab guide part with respect to an electrode sheet.

FIG. 7 is a perspective diagram schematically showing a tab guide part.

FIG. 8 is a diagram in a state cut along the line Y-Y of FIG. 6, which shows a tab guide part according to a first example of the present disclosure.

FIG. 9 is a diagram in a state cut along the line Y-Y of FIG. 6, which shows a tab guide part according to a second example of the present disclosure.

DETAILED DESCRIPTION

Hereinafter, an electrode sheet defect inspection device according to one example of the present disclosure will be described with reference to the attached drawings.

In this document, regardless of the reference numerals, the same or corresponding components are given by the same or similar reference numerals, duplicate descriptions thereof will be omitted, and for convenience of explanation, the size and shape of each component member as shown can be exaggerated or reduced.

FIG. 5 is a schematic diagram showing an electrode sheet defect inspection device (100) according to one example of the present disclosure.

Referring to FIGS. 2 and 5, the electrode sheet defect inspection device (100) comprises a transfer part (150) including a plurality of traveling rolls (151) for transferring an electrode sheet (10). The electrode sheet (10) is transferred along a preset traveling direction (MD) by the transfer part (150).

In this document, the electrode sheet (10) comprises a coating layer (11) and a plain part (12) provided on an electrode base material (10*a*, for example, copper or aluminum). The coating layer (11) represents a region on which a positive electrode or negative electrode slurry is coated, and the plain part (12) represents a region on the electrode base material (10*a*) where the coating layer (11) is not present. The plain part (12) is located at the edge along the width direction (W) of the electrode sheet (10). The width direction (W) of the electrode sheet (10) may be a direction orthogonal to the traveling direction (MD) of the electrode sheet (10).

The electrode sheet defect inspection device (100) may comprise a notching process part (110). Through the notching process, a tab part (15) is formed on the plain part (12) of the electrode sheet (10), and a plurality of tab parts (15) are sequentially provided along the traveling direction (MD) of the electrode sheet (10) on the electrode sheet (10) passing through the notching process part (100). As one example, the notching process part (110) may be provided to cut and process the plain part (12) by irradiating it with a laser. The notching process may be continuously performed during traveling of the electrode sheet (10).

The electrode sheet defect inspection device (100) comprises a vision inspection part (120) provided to inspect defects in each tab part (15) during the traveling process of the electrode sheet (10) on which the plurality of tab parts (15) is formed. The vision inspection part (120) may comprise one or more vision cameras.

Also, the electrode sheet defect inspection device (100) comprises a marking part (130) printing a defective mark (M) on the tab part (15) determined to be defective, based on the inspection information of the vision inspection part (110). The marking part (130) may comprise an inkjet type dispenser, and may be provided to spray ink onto the defective tab part (15).

In addition, the electrode sheet defect inspection device (100) may comprise a control part (190) for receiving inspection information from the vision inspection part (120) and controlling the marking part (130) based on the inspection information.

The control part (190) may be provided so that it receives inspection information of the vision inspection part (120), and calculates a time point when the tab part (15) determined to be detective passes through the marking part (130), based on the distance information between the vision inspection part (120) and the marking part (130), and the traveling speed information of the electrode sheet (10). At this time, when the tab part (15) determined to be defective from the vision inspection part (120) passes through the marking part (130), the control part (190) may allow to print the defective mark on the tab part (15) determined to be defective by operating the marking part (130). The marking operation of the marking part (130) may be performed during traveling of the electrode sheet (10).

FIG. 6 is a schematic diagram showing an arrangement state of a tab guide part (200) with respect to an electrode sheet (10), and FIG. 7 is a perspective diagram schematically showing a tab guide part (200).

In addition, the electrode sheet defect inspection device (100) comprises a tab guide part (200) disposed to pass the tab part (15) of the electrode sheet (10) passing through the marking part (130), having an opening (225) for exposing a partial region of the tab part (15) during traveling to the outside, and provided so that a partial region surrounding the opening (225) is transparent.

The tab guide part (200) may be provided in multiple numbers along the traveling direction (MD) of the electrode sheet (10), which performs a function of preventing the tab part (15) of the electrode sheet (10) from lifting or sagging during the traveling process.

FIG. 8 is a diagram in a state cut along the line Y-Y of FIG. 6, which shows a tab guide part according to a first example of the present disclosure.

Also, the electrode sheet defect inspection device (100) comprises a mark inspection part (140) provided to inspect the defective mark (M) indicated on the tab part exposed to the outside through the opening (225) of the tab guide part (200). The mark inspection part (140) may comprise a vision camera (141) having a predetermined inspection region (145) and an illumination lamp (143) for irradiating the inspection region (145) with light. In addition, the inspection information of the mark inspection part (140) is transmitted to the control part (190).

The electrode sheet defect inspection device (100) according to one example of the present disclosure comprises a vision inspection part (120), a marking part (130), and a tab guide part (200), which are disposed sequentially along the traveling direction (MD) of the electrode base material (10), wherein the mark inspection part (140) may be provided at the upper portion of the tab guide part (200).

The vision inspection part (120), the marking part (130), and the mark inspection part (140) are sequentially disposed along the traveling direction (MD) of the electrode sheet (10).

The tab guide part (200) may be disposed to pass the tab part (15) formed on the plain part (12) of the electrode sheet (10) passing through the marking part (130).

The tab guide part (200) may be disposed within the inspection region (145) of the mark inspection part (140). The tab guide part (200) is for preventing the tab part (15) of the electrode sheet (10) from fluttering or sagging during traveling, which performs a function of guiding the tab part (15) while passing it through the inside.

In addition, the tab guide part (200) performs a function of exposing the defective mark (M) indicated on the tab part (15) to the inspection region (145) of the mark inspection part (140) through the opening (225). In this way, the mark inspection part (140) may be provided to inspect the defective mark (M) of the tab part (15) exposed through the tab guide part (200) during traveling of the electrode sheet (10).

Referring to FIGS. 6 and 8, the tab guide part (200) is located within the inspection region (145) of the mark inspection part (140), and guides the traveling of the tab part (15) of the plain part (12) of the electrode sheet (10). In addition, the tab guide part (200) comprises an upper guide member (220) and a lower guide member (230).

The tab guide part (200) may comprise an upper guide member (220) disposed on the upper portion of the tab part (15) of the electrode sheet (10) during traveling, and having a first main body (221) having a first opening (225) for exposing the tab part (15), and an upper transparent member (229) provided to cover a partial region of the first opening (225). The first opening (225) may expose the upper surface of the tab part (15) to the outside of the tab guide part (200), and thus performs a function of exposing the upper surface of the tab part (15) to the inspection region (145) of the mark inspection part (140).

Also, the tab guide part (200) may comprise a lower guide member (230) disposed at the lower portion of the tab part (15) of the electrode sheet (10) during traveling, and positioned to be apart at a predetermined interval from the upper guide member (220).

In addition, the tab guide part (200) may be disposed so that the tab part (15) of the electrode base material (10) during traveling passes through the interval (d) between the upper guide member (220) and the lower guide member (230). That is, the upper guide member (220) and the lower guide member (230) may be disposed to be spaced apart at a predetermined interval (d) so that even when lifting or sagging, and the like occurs in the tab part (15) of the electrode sheet (10), it may pass between the upper guide member (220) and the lower guide member (230).

The upper guide member (220) and the lower guide member (230) may each be formed of a metal material, and for example, may each be formed of an aluminum material.

Referring to FIG. 8, the upper guide member (220) may have a first guide surface (222) facing the upper surface of the tab part (15). The first main body (211) may have a first guide surface (222) facing the upper surface of the tab part (15). The first guide surface (222) is disposed to face the upper surface of the tab part (15) during traveling.

Also, the upper transparent member (229) may be provided so that one surface is located on the same plane as the first guide surface (222). That is, in the upper transparent member (229), one surface may perform a function of guiding the traveling of the tab part (15) together with the first guide surface (222). That is, in the upper transparent member (229), one surface and the first guide surface (222) may be provided to be positioned on the same virtual plane without any step.

In addition, the upper guide member (220) may be provided so that the first guide surface (222) comprises a non-transparent region through which light does not transmit. That is, the first main body (221) having the first guide surface (222) may be formed to have a non-transparent region.

Furthermore, the upper guide member (220) may be provided so that a mounting surface (226), on which the upper transparent member (229) is mounted, is orthogonal to the first guide surface (222). That is, in the first main body (221), the mounting surface (226) facing the first opening (225) may be provided to be orthogonal to the first guide surface (222). In addition, the first opening (225) penetrates the first main body (221) up and down.

Also, in the upper guide member (220), the first main body (221) and the upper transparent member (229) may be formed of different materials. For example, the first main body (221) may be formed of an aluminum material, and the upper transparent member (229) may be formed of a glass material. In addition, the upper transparent member (229) is mounted on the first main body (211) to cover one region of the first opening (225). In this way, through the upper transparent member (229), the region where the defective mark (M) is exposed to the outside and the region guiding the traveling of the tab part (15) can be increased at the same time.

Referring to FIGS. 6 and 8, the mark inspection part (140) may be provided to inspect the defective mark (M) indicated on the tab part (15) exposed through the first opening (225) of the upper guide member (220). That is, the mark inspection part (140) may be disposed at the upper portion of the tab part (15) of the electrode sheet (10) during traveling. The upper guide member (220) may be disposed so that the first opening (225) is located within the inspection region (145), and the defective mark (M) indicated on the tab part (15) may be exposed to the inspection region (145) through the first opening (225).

Referring to FIG. 8, the lower guide member (230) may have the same structure as the upper guide member (200), and the upper guide member (220) and the lower guide member (230) may have a vertically symmetric shape based on the electrode sheet (10) during traveling.

The lower guide member (230) may have a second main body (231) having a second opening (235) for exposing the tab part (15), and a lower transparent member (239) provided to cover a partial region of the second opening (235).

Also, the lower guide member (230) may have a second guide surface (232) facing the lower surface of the tab part (15). That is, the second main body (231) may have a second guide surface (232) facing the lower surface of the tab part (15). The second guide surface (232) is disposed to face the lower surface of the tab part (15) during traveling.

As described above, the first guide surface (222) and the second guide surface (232) are disposed to be spaced apart from each other at a predetermined interval (d). The tab part (15) passes inside the tab guide part (200) through the interval (d) between the first guide surface (222) and the second guide surface (232).

Also, the first guide surface (222) and the second guide surface (232) may be disposed to be in parallel, where the first guide surface (222) may perform a function of preventing the tab part (15) during traveling from lifting, and the second guide surface (232) may perform a function of preventing the tab part (15) during traveling from sagging. For example, when the tab part (15) lifts, the electrode sheet (10) may be guided so that in the traveling process, the tab part (15) is in contact with the first guide surface (222), and the tab part (15) no longer lifts by the first guide surface (222). In addition, when the tab part (15) sags, the electrode sheet (10) may be guided so that in the traveling process, the tab part (15) is in contact with the second guide surface (222), and the tab part (15) no longer sags by the second guide surface (222).

In addition, the lower transparent member (239) may be provided so that one surface is located on the same plane as the second guide surface (232). That is, in the lower transparent member (239), one surface may perform a function of guiding the traveling of the tab part (15) together with the second guide surface (232). That is, in the lower transparent member (239), one surface and the second guide surface (232) may be provided to be positioned on the same virtual plane without any step.

Furthermore, the lower guide member (230) may be provided so that the second guide surface (232) comprises a non-transparent region through which light does not transmit. That is, the second main body (231) having the second guide surface (232) may be formed to have a non-transparent region.

Also, the lower guide member (230) may be provided so that a mounting surface (236), on which the lower transparent member (239) is mounted, is orthogonal to the second guide surface (232). That is, in the second main body (231), the mounting surface (236) facing the second opening (235) may be provided to be orthogonal to the second guide surface (232). In addition, the second opening (235) penetrates the second main body (231) up and down.

Also, in the lower guide member (220), the second main body (231) and the lower transparent member (239) may be formed of different materials. For example, the second main body (231) may be formed of an aluminum material, and the lower transparent member (239) may be formed of a glass material. In addition, the lower transparent member (239) is mounted on the second main body (231) to cover one region of the second opening (235).

Referring to FIG. 7, the upper guide member (220) and the lower guide member (230) may be rotatably connected. That is, the first main body (221) of the upper guide member (220) and the second main body (231) of the lower guide member (230) may be connected via a hinge (250), and accordingly, the first main body (221) and the second main body (231) may be rotated in directions closer to each other, or may be rotated in directions away from each other.

In the electrode sheet defect inspection device (100) having such a structure, defects in the tab parts (15) of the electrode sheet (10) are inspected as follows.

The electrode sheet (10) passing through the notching process part (110) sequentially passes through the vision inspection part (120), the marking part (130), and the mark inspection part (140).

The vision inspection part (120) is installed on the traveling path (MD) of the electrode sheet (10) to photograph the tab part (15) of the electrode sheet (10) during traveling after the notching process is completed. The vision inspection part (120) inspects defects (folded or lifted, etc.) in the tab part (15) of the electrode sheet (10), based on the preset defect information and photographic information.

Also, the marking part (130) indicates a defective mark (M) on the defective tab part (15) among the tab parts of the electrode sheet (10), based on the inspection information of the vision inspection part (120).

In addition, the tab guide part (200) passes the tab part (15) therein when the electrode sheet (10) is traveling, and the mark inspection part (140) is provided to inspect the defective mark (M) of the tab part (15) exposed through the first opening (225) of the tab guide part (220) when the electrode sheet (10) is traveling.

As described through FIG. 8, the upper guide member (220) and the lower guide member (230) may have a vertically symmetric shape based on the electrode sheet (10) during traveling.

Alternatively, the upper guide member (220) and the lower guide member (230) may also have a vertically asymmetric structure based on the electrode base material (10).

FIG. 9 is a diagram in a state cut along the line Y-Y of FIG. 6, which shows a tab guide part (300') according to a second example of the present disclosure.

Referring to FIG. 9, in the tab guide part (200), the lower guide member (230') is disposed at the lower portion of the tab part (18) of the electrode sheet (10) during traveling, and is positioned to be apart at a predetermined interval from the upper guide member (220).

The lower guide member (230') may have a second opening (235') for exposing the tab part (15). However, the lower transparent member is not provided on the second opening (235').

Also, the lower guide member (230') may have a second guide surface (232') facing the lower surface of the tab part (15). The second guide surface (232') is disposed to face the lower surface of the tab part (15) during traveling.

In addition, the lower guide member (230') may be provided so that the second guide surface (232') comprises a non-transparent region through which light does not transmit. That is, the second guide surface (232') may be formed to have a non-transparent region.

Furthermore, in the lower guide member (230'), an inner peripheral surface (236') facing the second opening (235') may be provided to be orthogonal to the second guide surface (232').

The preferred examples of the present disclosure as described above have been disclosed for illustrative purposes, and those skilled in the art having ordinary knowledge of the present disclosure will be able to make various modifications, changes, and additions within the spirit and scope of the present disclosure, and such modifications, changes, and additions should be regarded as falling within the scope of the following claims.

INDUSTRIAL APPLICABILITY

According to the electrode sheet defect inspection device related to one example of the present disclosure, as a partial region of the tab guide part is formed of a transparent material, it is possible to prevent shadows from occurring upon inspecting defective marks.

The invention claimed is:

1. An electrode sheet defect inspection device comprising:

a vision inspection part configured to inspect defects in a plurality of tab parts during a traveling process of an electrode sheet on which the plurality of tab parts is formed;

a marking part configured to print a defective mark on a selected tab part of the plurality of tab parts in response to the selected tab part being determined to be defective, based on inspection information of the vision inspection part;

a tab guide part configured to pass the plurality of tab parts when the electrode sheet passes through the marking part, wherein the tab guide part has an opening for exposing a partial region of the plurality of tab parts when the plurality of tab parts travel to an outside, and wherein the tab guide part includes a transparent region adjacent to the opening; and a mark inspection part configured to inspect the defective mark printed on the selected tab part, wherein the selected tab part is exposed to the outside through the opening of the tab guide part.

2. The electrode sheet defect inspection device according to claim 1, wherein the tab guide part includes:

an upper guide member disposed at an upper portion of the plurality of tab parts of the electrode sheet during traveling, wherein the upper guide member includes a first main body having a first opening for exposing the plurality of tab parts and an upper transparent member configured to cover a partial region of the first opening, and a lower guide member disposed at a lower portion of the plurality of tab parts of the electrode sheet during traveling, wherein the lower guide is positioned to be spaced apart at a predetermined distance from the upper guide member.

3. The electrode sheet defect inspection device according to claim 2, wherein the tab guide part is configured such that the plurality of tab parts of the electrode sheet during traveling pass through the distance between the upper guide member and the lower guide member.

4. The electrode sheet defect inspection device according to claim 2, wherein the upper guide member has a first guide surface, and wherein the first main body is configured to face the upper surface of the plurality of tab parts, and the upper transparent member is configured such that a first surface of the upper transparent member is positioned on a same plane as the first guide surface.

5. The electrode sheet defect inspection device according to claim 4, wherein the upper guide member is configured such that the first guide surface includes a non-transparent region that does not transmit light therethrough.

6. The electrode sheet defect inspection device according to claim 5, wherein in the upper guide member, the first main body and the upper transparent member are formed of different materials.

7. The electrode sheet defect inspection device according to claim 4, wherein the upper guide member is configured such that a first mounting surface, on which the upper transparent member is mounted, is orthogonal to the first guide surface.

8. The electrode sheet defect inspection device according to claim 2, wherein the upper transparent member is formed of a glass material.

9. The electrode sheet defect inspection device according to claim 2, wherein the mark inspection part is configured to inspect the defective mark printed on the selected tab part exposed through the first opening of the upper guide member.

10. The electrode sheet defect inspection device according to claim 2, wherein the lower guide member includes a second main body having a second opening for exposing the plurality of tab parts, and a lower transparent member configured to cover a partial region of the second opening.

11. The electrode sheet defect inspection device according to claim 10, wherein the lower guide member includes a second guide surface and wherein the second main body is configured to face a lower surface of the tab part, and the lower transparent member is configured such that a first surface of the lower transparent member is positioned on a same plane as the second guide surface.

12. The electrode sheet defect inspection device according to claim 11, wherein the lower guide member is configured such that the second guide surface includes a non-transparent region that does not transmit light therethrough.

13. The electrode sheet defect inspection device according to claim 11, wherein the lower guide member is configured such that a second mounting surface, on which the lower transparent member is mounted, is orthogonal to the second guide surface.

14. The electrode sheet defect inspection device according to claim 10, wherein in the lower guide member, the second main body and the lower transparent member are formed of different materials.

15. The electrode sheet defect inspection device according to claim 10, wherein the lower transparent member is formed of a glass material.

* * * * *